United States Patent
Watts

(10) Patent No.: US 7,499,924 B2
(45) Date of Patent: Mar. 3, 2009

(54) METHOD FOR RELEASING UPDATE LOCKS ON ROLLBACK TO SAVEPOINT

(75) Inventor: Julie A. Watts, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 11/184,619

(22) Filed: Jul. 18, 2005

(65) Prior Publication Data

US 2006/0004757 A1 Jan. 5, 2006

Related U.S. Application Data

(63) Continuation-in-part of application No. 09/894,073, filed on Jun. 28, 2001, now abandoned.

(51) Int. Cl.
*G06F 7/00* (2006.01)
(52) U.S. Cl. .......................................... 707/8; 707/200
(58) Field of Classification Search ...................... 707/8, 707/202
See application file for complete search history.

(56) References Cited

U.S. PATENT DOCUMENTS

| 5,280,612 | A | * | 1/1994 | Lorie et al. ..................... 707/8 |
| 5,327,556 | A | | 7/1994 | Mohan et al. ................... 707/8 |
| 5,452,445 | A | | 9/1995 | Hallmark et al. ............. 395/600 |
| 5,465,328 | A | | 11/1995 | Dievendorff et al. ........... 714/15 |
| 5,490,271 | A | | 2/1996 | Elliott et al. .................. 395/650 |
| 5,630,124 | A | | 5/1997 | Coyle, Jr. et al. ............. 395/614 |
| 5,737,601 | A | | 4/1998 | Jain et al. ..................... 395/617 |
| 5,778,388 | A | | 7/1998 | Kawamura et al. ........... 707/203 |
| 5,806,075 | A | | 9/1998 | Jain et al. ..................... 707/201 |
| 5,850,508 | A | | 12/1998 | Lee et al. ....................... 714/20 |
| 5,870,758 | A | | 2/1999 | Bamford et al. .............. 707/201 |
| 5,897,638 | A | | 4/1999 | Lasser et al. ................. 707/102 |
| 5,966,706 | A | | 10/1999 | Biliris et al. ................... 707/10 |
| 5,983,225 | A | * | 11/1999 | Anfindsen ....................... 707/8 |
| 6,009,425 | A | | 12/1999 | Mohan ............................ 707/8 |

(Continued)

OTHER PUBLICATIONS

Mahon et al., Aries: A Transaction Recovery Method Supporting Fine-Granularity Locking and Partial Rollbacks Using Write-Ahead Logging, Mar. 1992, ACM Transactions on database Systems, vol. 17, pp. 94-162.*

(Continued)

*Primary Examiner*—Pierre M Vital
*Assistant Examiner*—Truong V Vo
(74) *Attorney, Agent, or Firm*—Sawyer Law Group LLP

(57) ABSTRACT

A method for selectively releasing locks when rolling back to a savepoint includes: providing at least one savepoint in a transaction, where the at least one savepoint and the transaction are separate lock owners, where at least one lock is assigned to the at least one savepoint and at least one lock is assigned to the transaction; rolling back the transaction to the at least one savepoint; and releasing any locks owned by the at least one savepoint, where any locks owned by the transaction is maintained. Ownership of locks to persist until commit is assigned to the transaction. Ownership of locks to be released when rolled back to a savepoint is assigned to the savepoint. When roll back to a given savepoint occurs, locks owned by the savepoint are released while locks owned by the transaction are maintained.

9 Claims, 3 Drawing Sheets

U.S. PATENT DOCUMENTS

| | | | | |
|---|---|---|---|---|
| 6,047,285 | A | * | 4/2000 | Jacobs et al. .................... 707/4 |
| 6,105,025 | A | | 8/2000 | Jacobs et al. .................... 707/8 |
| 6,233,585 | B1 | | 5/2001 | Gupta et al. ............ 707/103 R |
| 6,374,264 | B1 | | 4/2002 | Bohannon et al. ........... 707/202 |
| 6,449,623 | B1 | | 9/2002 | Bohannon et al. ........... 707/202 |
| 2003/0004970 | A1 | * | 1/2003 | Watts ......................... 707/200 |

OTHER PUBLICATIONS

Mahon et al. (Aries: A Transaction Recovery Method Supporting Fine-Granularity Locking and Partial Rollbacks Using Write-Ahead Looging), Mar. 1992, ACM Transactions on Database Systems, vol. 17, No. 1.*

J.A. VanderVeen, "Lock Management Architecture," IBM Technical Disclosure Bulletin, vol. 32, No. 9A, Feb. 1990, pp. 214-217.

J.A. VanderVeen, "Lock Management Architecture," IBM Technical Disclosure Bulletin, vol. 31, No. 5, Oct. 1988, pp. 125-128.

T. Fukuda et al., "Method to Ensure the Integrity of File Operations in a Database Transaction," IBM Technical Disclosure Bulletin, vol. 38, No. 7, Jul. 1995, pp. 475-477.

Bradshaw, Dexter, "Failure Isolation and Recovery in Composite Multidatabases," Procs. of the 1994 Conference of the Centre for Advanced Studies on Collaborative Research, IBM Press, Oct. 1994, pp. 1-10.

Komacker et al., "Concurrency and Recovery in Generalized Search Trees," Procs. Of the 1997 ACM SIGMOD International Conference on Management Data, ACM Press, Jun. 1997, pp. 62-72.

Indrajit et al., "An Advnaced Commit Protocol for MLS Distributed Database Systems," Proceedings of the 3$^{rd}$ ACM Conference on Computer and Communications Security, ACM Press, Jan. 1996, pp. 119-128.

Mohan et al., "Aries: A Transaction Recovery Method Supporting Fine-Granularity Locking and Partial Rollbacks Using Write-Ahead Logging," ACM Transactions on Database Systems, ACM Press, Mar. 1992, vol. 17, No. 1, pp. 94-162.

* cited by examiner

METHOD FOR RELEASING UPDATE LOCKS ON ROLLBACK TO SAVEPOINT

CROSS-REFERENCE TO RELATED APPLICATIONS

This application is a Continuation-in-Part of U.S. patent application Ser. No. 09/894,073, entitled "Method for Releasing Update Locks on Rollback to Savepoint," filed on Jun. 28, 2001 now abondoned.

FIELD OF THE INVENTION

The present invention relates to database systems, and more particularly to transactions performed on database systems.

BACKGROUND OF THE INVENTION

In relational database management systems (RDBMS), a "transaction" refers to an exchange between a workstation and a program, two workstations, or two programs that accomplish a particular action or result. The transaction begins when the exchange begins and ends when commitment is made to the particular action or result. Several conventional RDBMS support sub-transactions through the use of savepoints. Savepoints are created between the beginning of the transaction and the commit. The savepoints allow modifications made to data since a savepoint to be undone. This is referred to herein as "rollback to a savepoint".

For example, assume that a user, through a workstation and/or application, accesses a RDBMS for a travel agency. The user wishes to book airline, hotel, and rental car reservations. The user researches available flights and books airline reservations. A first savepoint is established. The user further researches available hotels and books hotel reservations. A second savepoint is established. The user then researches available rental cars but cannot find a suitable reservation which matches the hotel reservation. The user may then roll back to the first savepoint to search for a different hotel. The data modified since the first savepoint are undone so that the user can book reservations at a different hotel.

For transactions to occur with integrity, two transactions must be prevented from updating the same piece of data at the same time. Locks on the data being updated are typically used. For example, if user A, performing transaction A, is updating data pertaining to reservations for an airline flight, a lock is established on the airline flight data. With this lock, user B, performing transaction B, is prevented from updating the same airline flight data at the same time as user A, and must wait until transaction A completes and releases the lock. Similarly, for transactions to read data with integrity, a read transaction must be prevented from seeing data that has been changed by an updating transaction but not yet committed, and be allowed to see data that has been changed by an updating transaction as soon as it is committed. Locks on the data being read are typically used. For example, if user A, performing transaction A, is updating data pertaining to reservations for an airline flight, a lock is established on the airline flight data. User B, performing read transaction B, cannot read that data until transaction A completes and releases the lock.

If a read transaction requires read stability or read repeatability for the duration of the transaction, read locks are held until the read transaction is completed. Thus, if transaction C is a read transaction that reads airline reservation information and that requires read stability or repeatability, transaction C will establish locks on all data read. Another transaction, D, wishing to update the airline reservation information, must wait for read transaction C to complete and release the lock.

When rollback to savepoint occurs, one must consider locks acquired since the savepoint. Those locks taken to provide read stability or repeatability of data read since the savepoint must not be released, while those locks taken to keep the changes, now being rolled back, from being seen by other transactions may be released.

Accordingly, there exists a need for a method for selectively releasing locks when rolling back to a savepoint. The present invention should build upon a common feature of lock manages, the capacity to efficiently release locks owned by a given owning work unit. The method should not incur unduly burdensome overhead. The present invention addresses such a need.

SUMMARY OF THE INVENTION

A method for selectively releasing locks when rolling back to a savepoint includes: providing at least one savepoint in a transaction, where the at least one savepoint and the transaction are separate lock owners, where at least one lock is assigned to the at least one savepoint and at least one lock is assigned to the transaction; rolling back the transaction to the at least one savepoint; and releasing any locks owned by the at least one savepoint, where any locks owned by the transaction is maintained. The ownership of locks which are to persist until commit is assigned to the transaction. The ownership of locks which are to be released when roll back to a given savepoint occurs is assigned to the savepoint. When a rollback to the savepoint occurs, locks owned by the savepoint are released while locks owned by the transaction are maintained. In this manner, selective release of locks is provided without incurring unduly burdensome overhead.

DETAILED DESCRIPTION

The present invention provides a method for selectively releasing locks when rolling back to a savepoint. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method in accordance with the present invention utilizes the concept of savepoint-transaction teams where the savepoint and the transaction are separate lock owners within the team. Most lock managers possess the capacity to efficiently release all locks owned by a given owning work unit. Such a feature is typically used, at transaction-commit, to efficiently release all locks owned (i.e., acquired by) the committing transaction. The present invention builds upon this common feature of lock managers. Ownership of locks to persist until commit is assigned to the transaction. Ownership of locks to be released when rollback to a given savepoint occurs is assigned to the savepoint. When a roll back to the savepoint occurs, any locks owned by the savepoint are released while any locks owned by the transaction are maintained. The present invention is thus provided with high performance through use of a lock manager primitive to efficiently release locks by owner.

To more particularly describe the features of the present invention, please refer to FIGS. 1 through 3 in conjunction with the discussion below.

Figure 1:
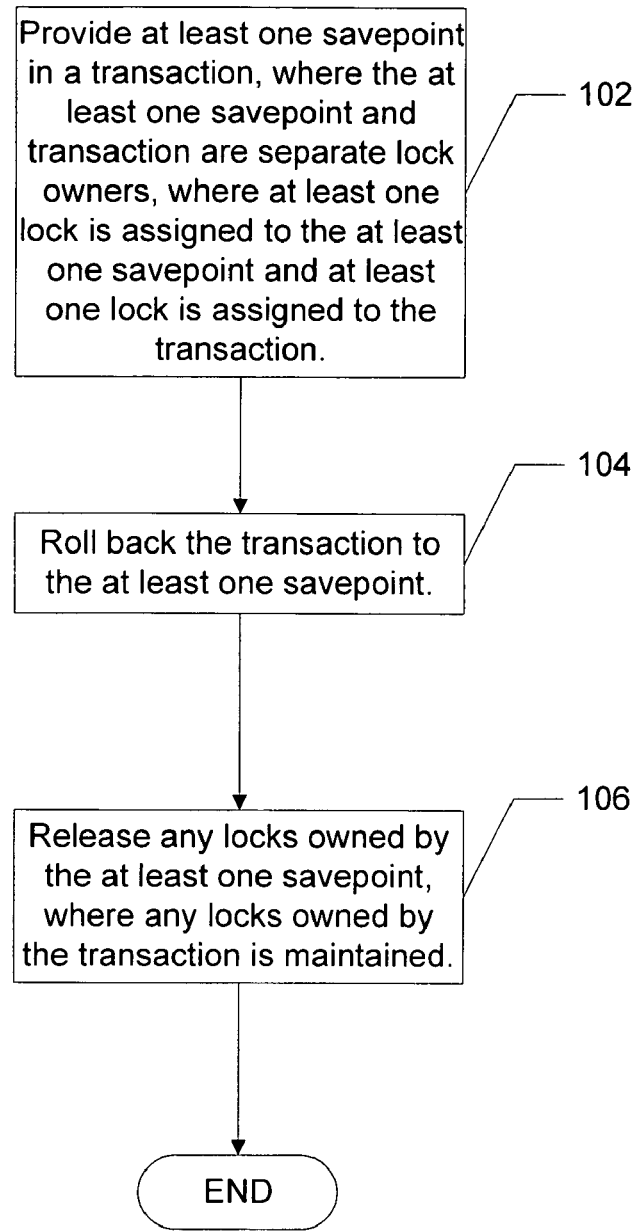
FIG. 1 is a flowchart illustrating a preferred embodiment of a method for selectively releasing locks when rolling back to a savepoint in accordance with the present invention.
Figure 2:
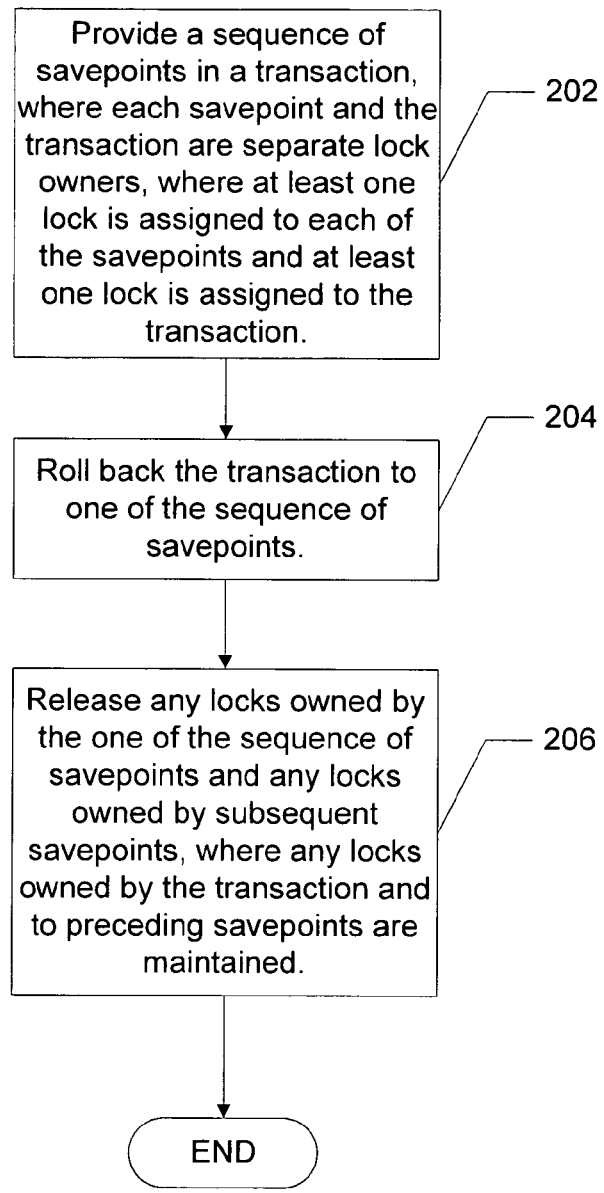
FIG. 2 is a flowchart illustrating a preferred embodiment of the method for selectively releasing locks when rolling back through a sequence of savepoints in accordance with the present invention.

FIG. 1 is a flowchart illustrating a preferred embodiment of a method for selectively releasing locks when rolling back to a savepoint in accordance with the present invention. First, at least one savepoint in a transaction is provided, via step 102, where the at least one lock is assigned to the at least one savepoint and at least one lock is assigned to the transaction. In the preferred embodiment, multiple lock owners can be provided for the same transaction. The at least one savepoint and the transaction are identified as separate lock owners to a lock manager. The savepoint and the transaction become a team. Locks which are to persist until commit are assigned to the transaction, and locks which are to be released when rolled back to the at least one savepoint is assigned to the at least one savepoint. When the transaction is rolled back to the at least one savepoint, via step 104, any locks owned by the at least one savepoint is released, via step 106, while any locks owned by the transaction is maintained. The lock manager thus releases all locks owned by the at least one savepoint in the same manner as it would for any other lock owner. Individual lock requests are not needed to release locks for the roll back to the savepoint. Overhead is thus kept to a minimum.

For a savepoint and the underlying transaction to work as a team, the transaction is allowed to own a read lock at the same time as a savepoint within the transaction owns a write lock. This is achieved by utilizing a lock manager constructs known as "compatibility classes". By assigning the transaction and its savepoints to the same compatibility class, the desired effect is achieved. Otherwise incompatible locks are granted to different owners provided they are members of the same "compatibility class" (team).

For example, using the RDBMS for a travel agency example above, assume that the user wishes to book airline, hotel, and rental car reservations. The user researches available flights and books airline reservations. Locks acquired are assigned to the transaction. When the user is done with the airline reservations, a savepoint is established. Both the transaction and the savepoint are identified as separate lock owners. The savepoint and the transaction becomes a team. The user then researches available hotels. Data which are to be updated in booking the hotel reservations are locked with "update locks". Data which are read by the user in booking the hotel reservations are also locked with "read locks". The update locks are assigned to the savepoint, and the read locks are assigned to the transaction, via step 102. Assume further that the user researches available hotels for a companion but cannot find a suitable reservation. The user then rolls back to the savepoint to change the hotel reservation, via step 104. In rolling back to the savepoint, any locks owned by the savepoint are released, via step 106, while any locks owned by the transaction are maintained. Here, the update locks assigned to the savepoint are released, while the read locks assigned to the transaction are maintained. In addition to rolling back to the most recent savepoint, as illustrated in FIG. 1, the method in accordance with the present invention may also be used with a sequence of savepoints, where the transaction is rolled back through more than one savepoint. Each savepoint and the transaction are identified as separate lock owners to the lock manager. In this scenario, as each savepoint in the sequence is established, it joins the savepoint-transaction team. FIG. 2 is a flowchart illustrating a preferred embodiment of the method for selectively releasing locks when rolling back through a sequence of savepoints in accordance with the present invention. First, a sequence of savepoints in a transaction is provided, via step 202, where each savepoint and the transaction are separate lock owners, and where at least one lock is assigned to each of the savepoints and at least one lock is assigned to the transaction. When the transaction is rolled back to one of the sequence of savepoints, via step 204, any locks owned by the one of the sequence of savepoints are released, and any locks owned by each subsequent savepoint are also released, via step 206. Any locks owned by the transaction and any locks owned by preceding savepoints are maintained.

For example, using the RDBMS for a travel agency example above, the user wishes to book airline, hotel, and rental car reservations. The user books the airline reservations, and the locks acquired are assigned to the transaction. When the user is done with the airline reservations, a first savepoint is established. The first savepoint and the transaction become a team and are separate lock owners. The user researches available hotels and books hotel reservations. A first set of update locks acquired after the first savepoint is assigned to the first savepoint. A first set of read locks acquired after the first savepoint is assigned to the transaction. When the user is done with the hotel reservations, a second savepoint is established. The second savepoint is added to the team and is another separate lock owner. The user then researches available rental cars. A second set of update locks acquired after the second savepoint is assigned to the second savepoint. A second set of read locks acquired after the second savepoint is assigned to the transaction. The first and second savepoints create a sequence of savepoints, via step 202. If the user later discovers that he/she cannot find a suitable rental car which matches the hotel reservation, then the user rolls back to the first savepoint to search for a different hotel, via step 204. In rolling back to the first savepoint, all locks owned by the first savepoint are released, via step 206. Here, the first set of update locks owned by the first savepoint is released. The second savepoint is a subsequent savepoint. Thus, in rolling back to the first savepoint, all locks owned by the second savepoint are released. Here, the second set of update locks owned by the second savepoint is also released. Any locks owned by the transaction are maintained. Here, the first and second sets of read locks owned by the transaction are maintained. In this example, there are no savepoints preceding the first savepoint. However, it there was, then the set of locks owned by the preceding savepoint is maintained as well, via step 206.

Figure 3:
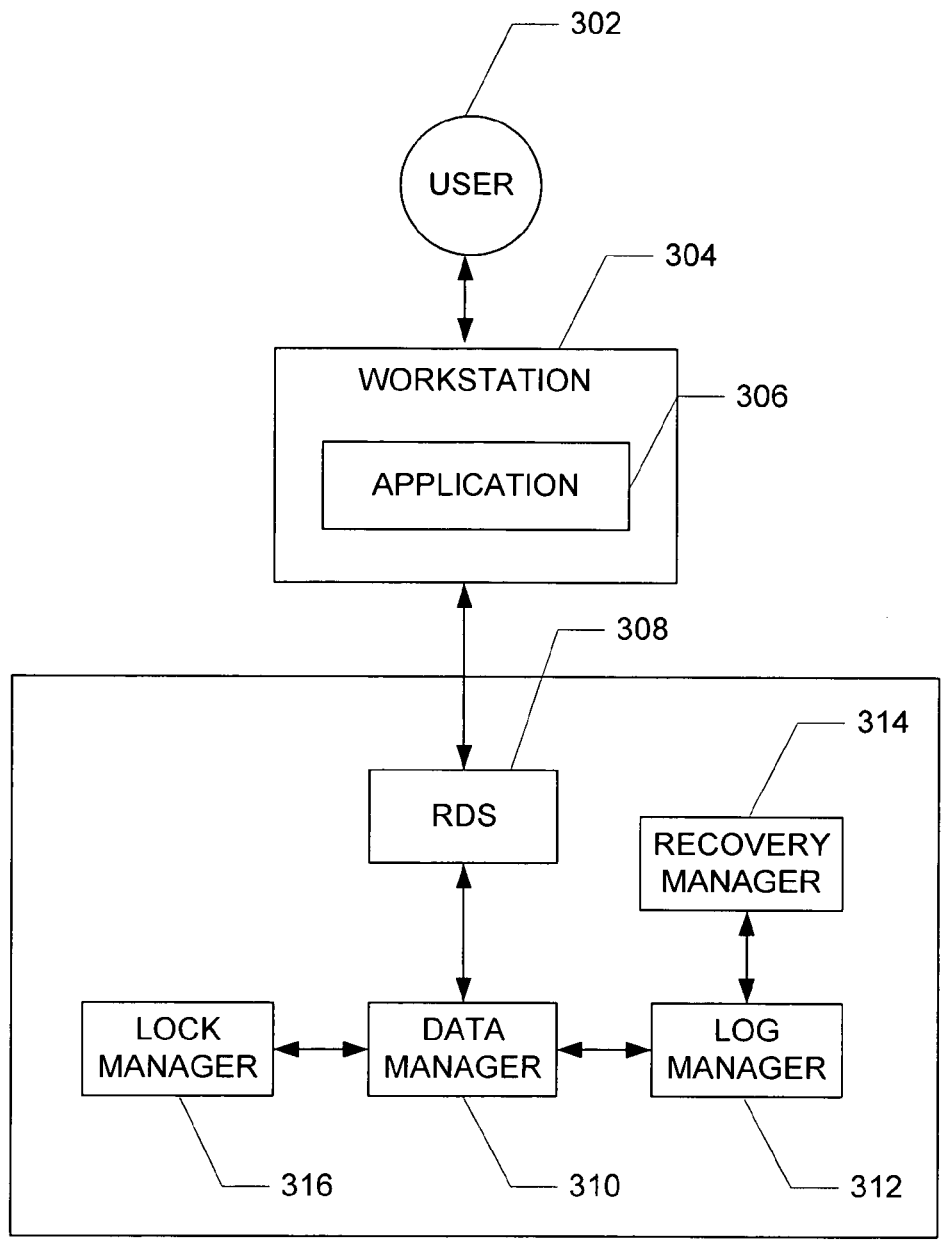
FIG. 3 illustrates a preferred embodiment of a system which utilizes the method for selectively releasing locks when rolling back to a savepoint in accordance with the present invention.

FIG. 3 illustrates a preferred embodiment of a system which utilizes the method for selectively releasing locks when rolling back to a savepoint in accordance with the present invention. The system comprises a relational data system 308 (RDS) and a data manager 310. The data manager 310 performs the tasks requested by a user 302, a workstation 304, or an application 306. The RDS 308 functions as an interface between the user 302, workstation 304, or application 306 and the data manager 310. The system also comprises a log manager 312, a recovery manager 314, and a lock manager 316. The log manager 312 maintains a log of tasks performed in the system. The recovery manager 314 manages rollbacks to savepoints and other tasks, such as transaction commit and system restart. The lock manager 316 manages data locks. In the preferred embodiment, the method in accordance with the present invention is implemented as software at the data manager 310 and the recovery manager 314. However, it may be implemented in other ways without departing from the spirit and scope of the present invention.

In the preferred embodiment, as the user 302, workstation 304, or application 306, through the RDS 308, progresses in a transaction, the data manager 310 requests locks from the lock manager 316 where appropriate. The lock manager 316 then creates and maintains the locks. The present invention relies on the capacity of the lock manager 316 to grant otherwise incompatible locks to both the transaction and the savepoint(s) by virtue of the fact that the transaction and the savepoint(s) are defined as members of the same compatibility class. When a savepoint is established and defined as a separate lock owner, the data manager 310 assigns subsequent locks to either the savepoint or the transaction. All savepoints and data modifications are logged to the recovery log by the data manager 310 using the services of the log manager 312. When a rollback to savepoint occurs, the recovery manager 314 receives the request and advises the data manager 310 to perform the rollback. The data manager 310 then applies undo log records previously written to the recovery log by the log manager 312 until the savepoint log record is encountered. The data manager 310 requests the lock manager 316 to release locks owned by the savepoint and subsequent savepoints. The locks owned by the transaction and preceding savepoints continue to be maintained by the lock manager 316 until commit.

Although the present invention is described in the context of the system illustrated in FIG. 3, one of ordinary skill in the art will understand that the method can be utilized by other systems without departing from the spirit and scope of the present invention.

In the preferred embodiment, a savepoint may be subsequently released, for example, when it becomes clear the user will not rollback to the savepoint. When the savepoint is released, the method in accordance with the present invention may handle the locks owned by the savepoint in one of two ways. The locks may be reassigned to the savepoint immediately preceding the released savepoint, or the knowledge of the released savepoints are maintained for purposes of releasing the locks if rollback to the preceding savepoint should occur. Other ways are possible without departing from the spirit and scope of the present invention.

A method for selectively releasing locks when rolling back to a savepoint has been disclosed. The method utilizes the concept of savepoint-transaction teams. Ownership of locks which are to persist until commit is assigned to the transaction. Ownership of locks which are to be released when rolled back to a savepoint is assigned to the savepoint. When a roll back to the savepoint occurs, the locks owned by the savepoint are released while the locks owned by the transaction are maintained. In this manner, selective release of locks is provided without incurring unduly burdensome overhead.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for selectively releasing locks on data when rolling back to a savepoint, comprising the steps of:
   (a) providing at least one savepoint in a transaction having multiple lock owners wherein the transaction owns a read lock at the same time as the at least one savepoint within the transaction owns a write lock utilizing lock manager compatibility class constructs, assigning the savepoint and the transaction as a team, identifying the at least one savepoint and the transaction as separate lock owners to a lock manager, assigning to the at least one savepoint ownership of locks which are to be released when rolling back to the at least one savepoint occurs wherein at least one lock is assigned to the at least one savepoint and at least one lock is assigned to the transaction;
   (b) rolling back the transaction to the at least one savepoint;
   (c) releasing any locks owned by the at least one savepoint by the lock manager, and
   (d) maintaining any locks owned by the transaction and selectively releasing ownership of locks by the lock manager once commit is assigned to the transaction,
   (e) and providing for subsequently releasing a given savepoint which is not rolled back to wherein when the given savepoint is released, and releasing the locks owned by the given savepoint by reassigning the locks owned by the given savepoint to a savepoint immediately preceding the released given savepoint or maintaining knowledge of one or more released given savepoints for releasing the locks if rollback to a preceding savepoint should occur,
   wherein individual lock requests are not needed to release locks for rolling back to the at least one savepoint and
   the at least one savepoint further comprises a sequence of savepoints, where when the transaction is rolled back through more than one savepoint of the sequence, each savepoint of the sequence and the transaction are identified as separate lock owners to the lock manager, and as each savepoint of the sequence is established, the established savepoint becomes a member assigned to the team.

2. The method of claim 1, wherein the providing step (a) comprises:
   assigning the at least one savepoint and the transaction to same compatibility class to avoid granting of incompatible locks.

3. The method of claim 1, wherein the providing step (a) further comprises:
   assigning ownership of locks to persist until commit to the transaction; and
   assigning ownership of locks to be released when a roll back to the at least one savepoint occurs to the at least one savepoint.

4. The method of claim 1, wherein the providing step (a) comprises:
   providing a sequence of savepoints in the transaction, wherein each of the savepoints are separate lock owners, wherein at least one lock is assigned to each of the savepoints and the at least one lock is assigned to the transaction.

5. The method of claim 1, wherein the rolling step (b) comprises:
   rolling back the transaction to one of a sequence of savepoints.

6. The method of claim 1, wherein the releasing step (c) comprises:
   releasing at least one lock owned by one of a sequence of savepoints to which the transaction is rolled back;
   releasing at least one lock owned by subsequent savepoints, and,
   maintaining the at least one lock owned by the transaction and at least one lock owned by preceding savepoints.

7. The method of claim 6, further comprising:
   releasing another of the sequence of savepoints.

8. The method of claim 7, further comprising:
   reassigning at least one lock assigned to the another of the sequence of savepoints to a preceding savepoint.

9. The method of claim 7, further comprising:
   maintaining knowledge of the released another of the sequence of savepoints, such that if the transaction is rolled back to a preceding savepoint, the at least one lock owned by the released another of the sequence of savepoints is released.

\* \* \* \* \*